United States Patent [19]

Giuffredi

[11] Patent Number: 4,896,799

[45] Date of Patent: Jan. 30, 1990

[54] DEVICE WITH BUTTON INCORPORATING A SHUT-OFF MEANS, FOR DELIVERING LIQUIDS IN ATOMIZED FORM

[75] Inventor: Giancarlo Giuffredi, Milan, Italy

[73] Assignee: Coster-Technologie Speciali S.p.A., Italy

[21] Appl. No.: 204,209

[22] Filed: Jun. 8, 1988

[30] Foreign Application Priority Data

Jun. 19, 1987 [IT] Italy .............................. 20976 A/87

[51] Int. Cl.⁴ .......................... B65D 1/32; G01I 11/00; B67D 5/40

[52] U.S. Cl. .................................... 222/321; 222/385; 239/333

[58] Field of Search .................. 222/402.2, 402.1, 321, 222/383, 384, 385; 239/333

[56] References Cited

U.S. PATENT DOCUMENTS

| | | | |
|---|---|---|---|
| 2,362,080 | 11/1944 | Martin | 222/321 |
| 3,756,465 | 9/1973 | Meshberg | 222/402.2 X |
| 3,979,027 | 9/1976 | Loeffler . | |
| 4,057,176 | 11/1977 | Horvath | 222/321 X |
| 4,079,865 | 3/1978 | Kutik | 222/321 X |
| 4,140,249 | 2/1979 | Majima | 239/333 X |
| 4,191,313 | 3/1980 | Blake et al. . | |
| 4,215,804 | 8/1980 | Giuffredi | 222/341 X |
| 4,222,501 | 9/1980 | Hammett et al. . | |
| 4,345,718 | 8/1982 | Horvath | 239/333 |
| 4,494,680 | 1/1985 | Corsette | 222/321 |
| 4,640,443 | 2/1987 | Corsette | 222/321 |

*Primary Examiner*—Kevin P. Shaver
*Assistant Examiner*—Mona Beegle
*Attorney, Agent, or Firm*—Steinberg & Raskin

[57] ABSTRACT

The device comprises a pump with its plunger mobile in a cylinder against the action of a spring, and a delivery button associated with the plunger for controlling its delivery movement. The button incorporates a shut-off member provided on a flexible diaphragm fixed peripherally in a seat in the button.

6 Claims, 3 Drawing Sheets

DEVICE WITH BUTTON INCORPORATING A SHUT-OFF MEANS, FOR DELIVERING LIQUIDS IN ATOMIZED FORM

BACKGROUND OF THE INVENTION

This invention relates to a device for the atomized delivery of liquids (such as perfumes, medicaments) from containers, comprising a pump with its plunger mobile in a cylinder against the action of a spring, and a delivery button for manually operating the plunger.

Known deliver devices of this type can be divided into two groups. The first group, to which for example the device described in Italian Patent No. 1,038,354 belongs, is distinguished by considerable constructional simplicity but has the disadvantage that the quality of atomization depends on the manner (speed and applied force) in which the user operates the button.

The second group, known as the compensated pump group, has its plunger divided into two parts of different cross-section, of which the smaller one acts as the delivery valve and opens only when a given pressure acts on the liquid to be delivered. The devices of the second group are therefore constructionally more complicated than those of the first group, although they provide good atomization of those liquids which atomize at the determined pressures for which these pumps are expressly designated. Current requirements however dictate the need for devices able to atomize liquids requiring very different pressures for their atomization. This means that for this second group of atomizer devices, a range of plungers of different diameters or springs of different characteristics must be constructed.

SUMMARY OF THE INVENTION

An object of the invention is to provide an atomized delivery device comprising a pump of simple construction, in which the button itself determines the quality of atomization of the particular liquid concerned.

In this manner, one and the same simple pump can be used in a range of devices for atomizing the most various liquids, these devices differing from each other only by the specific button chosen, which in any event is a component now often personalized to suit the requirements of the particular client. The advantage of this is that the pump can be manufactured large quantities and held in store, and the specific button then produced not only to satisfy the personalization required by the client but also to satisfy the atomization requirements of the particular liquid to be sprayed.

This and further objects which will be more apparent from the detailed description given hereinafter are attained according to the invention by a device of the indicated type, characterized in that, in the button, there is provided a delivery duct or hole which can be shut off by a valving member carried by a flexible diaphragm fixed peripherally into a seat in the button.

Automization can therefore be optimized by correct choice of diaphragm flexibility and working section (the working section being that part of the diaphragm surface which undergoes deformation).

BRIEF DESCRIPTION OF THE DRAWINGS

The invention will be more apparent from the detailed description of three embodiments thereof given hereinafter by way of non-limiting example with reference to the accompanying drawing, in which.

DESCRIPTION OF THE PREFERRED EMBODIMENTS

Figure 1:
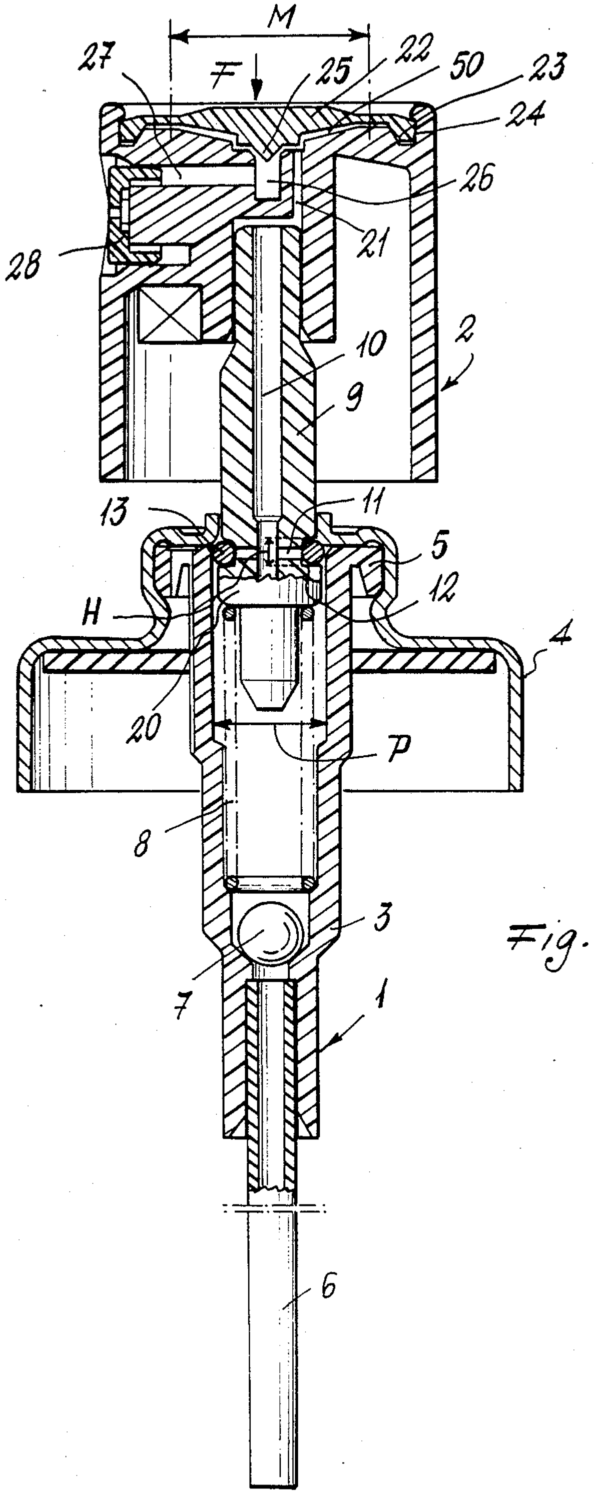
FIG. 1 is an axial section through a first embodiment of the delivery device according to the invention.

In FIG. 1, the reference numeral 1 indicates a conventional plunger pump (described in Italian Patent 1,038,354) and 2 indicates an operating and atomization button.

The pump 1 comprises a hollow body 3 secured upperly to a cap 4 by a flange 5. The cap 4 is used for connection to a container, not shown, containing the liquid to be delivered, into which there dips a tube 6 force-fitted into the lower end of the hollow body 3.

A ball 7 acting as an intake valve is disposed in the hollow body 3, in which there is also housed a compression spring 8 which acts between a plunger 20 and an inner shoulder on the body 3.

The plunger slides within the body 3 along that region thereof of cross-section 9. It has its rod 9 traversed by a dead bore 10. This bore opens lowerly into radial bores 11 which open into a circumferential groove 12 housing an O-ring 13. The height H of the groove 12 is greater than that of the ring 13, so that the ring is displaced upwards or downwards in this groove according to the direction of movement of the plunger 20, to close the bores 11 when in its lower position and to open them when in its upper position.

The button 2 is force-fitted onto the rod 9, and comprises a duct 21 positioned as an extension to the plunger bore 10. This duct opens into an interspace below an elastically deformable diaphragm 22 provided with a thickened peripheral edge 23 which is clamped in an annular undercut groove 24 provided in the top of the button.

The diaphragm 22 comprises in the centre of its face a projection 25 able to close a hole 26 provided in the button and communicating with the duct 21 when the projection is raised from the hole 26.

The hole 26 extends transversely in the form of a channel 27 of annular cross-section in which a conventional atomizer nozzle 28 is force-fitted in hydraulic comunication with the channel.

The diaphragm section subject to deformation is indicated by M and is larger than the section P of the plunger or of the bore in the body 3 within which the plunger slides.

It will be assumed that after the previous delivery a given quantity of liquid has remained trapped in the hollow body 3 between the plunger 20 and ball 7. When the user wishes to deliver liquid he pushes (arrow F) the button 2 by pressing the diaphragm to close the hole 26 by means of the projection 25. The liquid therefore becomes pressurised and this pressure extends as far as below the diaphragm 22 to exert a thrust thereon which acts against that exerted by the user in the direction of the arrow F and is related of the ratio of M to P. At a certain moment this opposing force exceeds the other so that the diaphragm rises to displace the projection 25 from the hole 26, and the pressurised liquid flows to the nozzle to emerge therefrom in atomized form.

On releasing the button 2 the spring 8 returns it to its initial position. During this stage liquid is drawn into the body 3 through the dip tube 6 and intake valve 7.

To satisfy the requirements of liquids which atomize at different pressures it is necessary only to replace the diaphragm 22 with another of different flexibility characteristics, for example by providing stiffer, thinner or thicker parts or using different materials.

Figure 2:
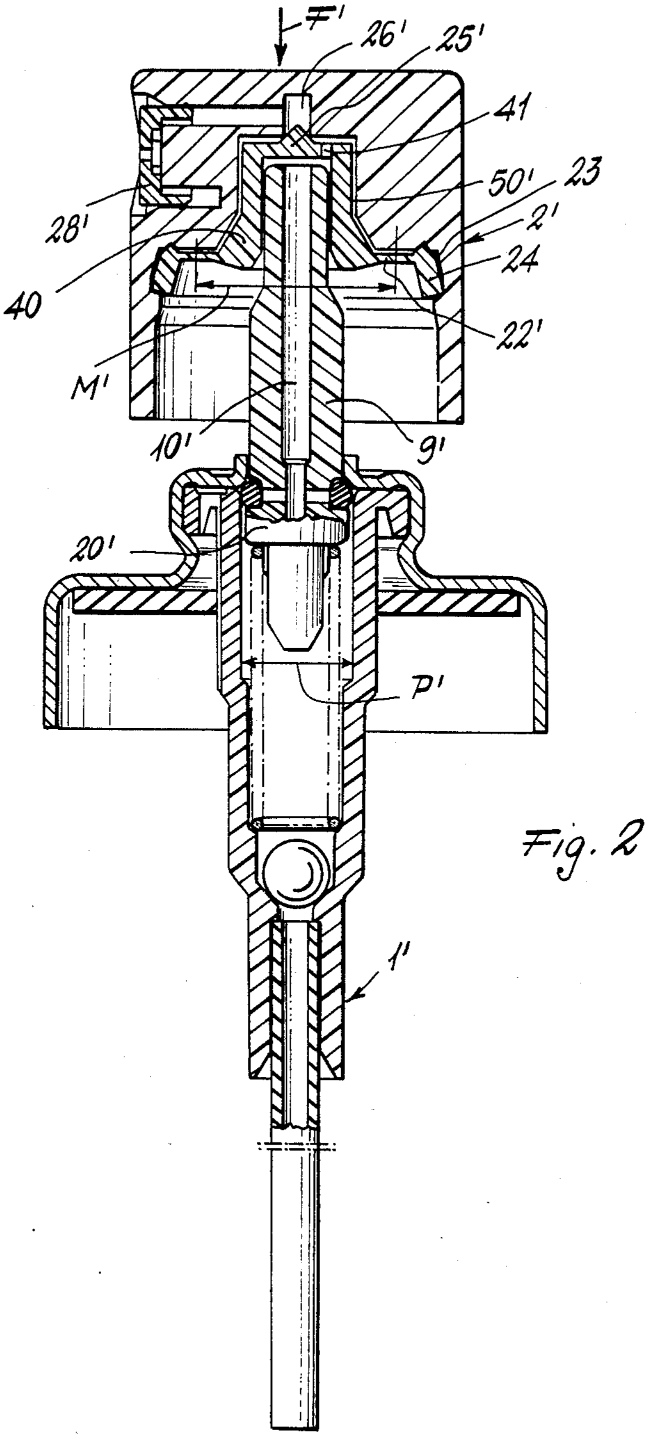
FIGS. 2 and 3 are axial sections through two further embodiments of the invention.

A further embodiment of the invention is shown in FIG. 2. In this, parts identical or corresponding to those of FIG. 1 are indicated by the same reference numerals marked with a prime. In this case, the diaphragm 22′ has its projection 25′ at the upper end of a central tubular appendix 40 which is drawn over the rod 9′ and is provided with an eccentric hole 41 to establish communication between the duct 10′ of the rod 9′ and the hole 26′ with which the projection 25; cooperates.

Operation is similar to that of the embodiment of FIG. 1. The thrust F′ on the button results in the creation of a pressure which is transmitted through the hole 41 and into the interspace 50′ between the button and diaphragm. At a certain point the valving member 25′ separates from the hole 26′ so that the pressurised liquid flows to the nozzle 28′ to emerge in atomized form.

Figure 3:
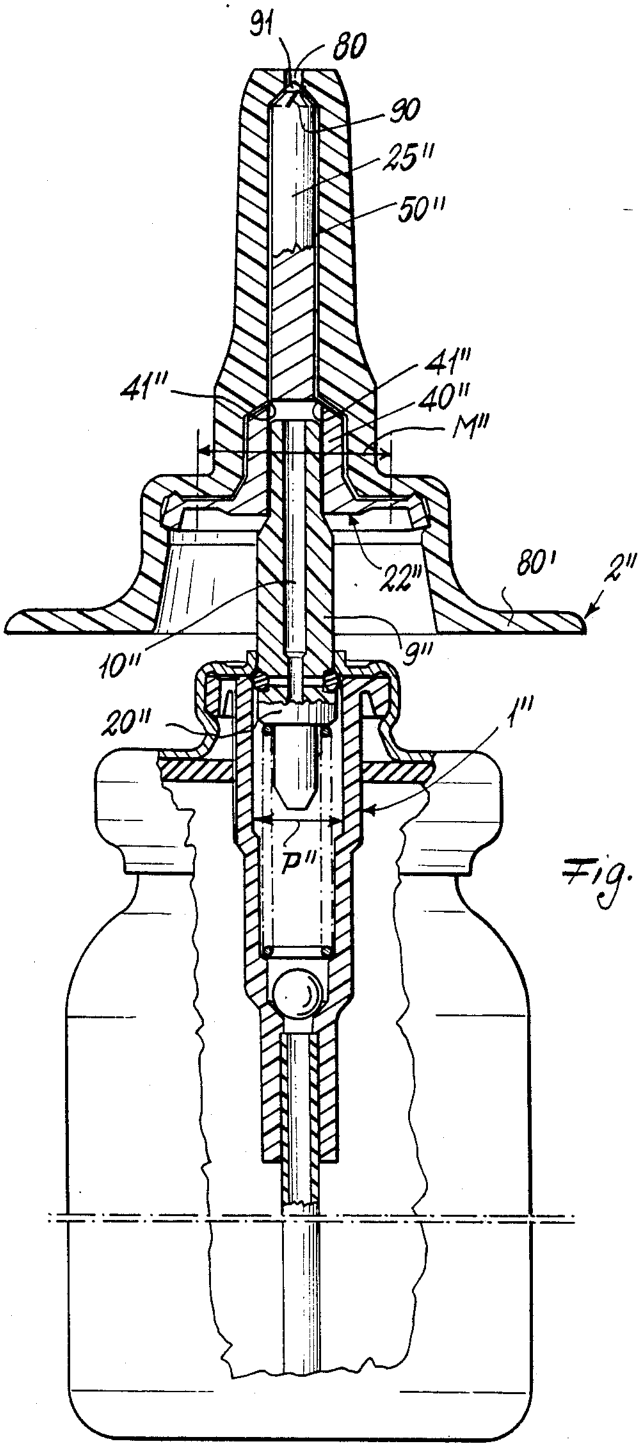

FIG. 3 shows a third embodiment of the invention with its container holding the liquid to be delivered. Identical or corresponding parts are again indicated by the same reference numeral but with a double prime. The button 2″ is in this case of bell shape and comprises a flange or lower ledges 80′ which the user presses to deliver the liquid. The diaphragm 22″ is at the center of a tubular appendix 40″ into which the upper end of the rod 9″ of the pump 1″ penetrates. From the top of the appendix 40″ there extends a projection 25″ which acts on a delivery hole 80 in the button. Ribs, channels or the like 90 of approximately helical or inclined extention located beyond the valving end 91 of the projection 25″ create turbulence with facilitates atomization.

In the transition region between the projection 25″ and the tubular 40″, holes 41″ are provided to connect the duct 10″ of the rod 9″ to the interspace 50″ between the button 2″ and said parts of the diaphragm 22″.

The plunger 20″ of the pump 1 is moved by pressing 80′ with the forefinger and ring finger. The conical end 91 of the projection 25″ then makes contact with and closes the hole 80. The liquid contained in the pump flows into the interspace 50″. As the thrust increases, the moment is reached when the end 91 separates from and opens the hole 80. The liquid then moves with vortex motion to the hole 80, as it emerges from it.

Again as in the preceding cases, atomisation at different pressures can be obtained by altering the flexibility characteristics of the diaphragm.

What I claim is:

1. A device for atomized delivery of liquids such as perfumes and medicaments from containers, comprising
   a pump having a plunger mobile in a cylinder against action of a spring, and
   a delivery button connected to the plunger for manually operating the same,
   wherein a delivery duct or hole is provided in the button and which can be shut off by a valving member carried by a flexible diaphragm fixed peripherally into a seat in the button,
   said diaphragm comprises a central tubular projection, and
   the valving member is situated at a center of the tubular projection.

2. The device of claim 1, wherein the diaphragm has a working section larger than a section of the cylinder in which the plunger is mobile.

3. The device of claim 1, wherein the diaphragm is located in an exposed position in a top of the button.

4. The device of claim 1, wherein the diaphragm is located within the button.

5. A device for atomized delivery of liquid such as perfumes and medicaments from containers, comprising
   a pump having a plunger mobile in a cylinder against action of a spring, and
   a delivery button connected to the plunger for manually operating the same,
   wherein a delivery duct or hole is provided in the button and which can be shut off by a valving member carried by a flexible diaphragm fixed peripherally into a seat in the button,
   said diaphragm comprises a central tubular projection, and
   wherein a part enabling pressure to be transmitted from the pump to the diaphragm, is provided in the tubular projection.

6. The device of claim 5, wherein said part is at least one hole provided in said tubular projection.

* * * * *